United States Patent
Kawashima et al.

(10) Patent No.: US 8,657,094 B2
(45) Date of Patent: Feb. 25, 2014

(54) CLUTCH DEVICE FOR VEHICLE

(75) Inventors: Keiichiro Kawashima, Chiryu (JP);
Yoshikazu Akahoshi, Tokai (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 275 days.

(21) Appl. No.: 13/295,521

(22) Filed: Nov. 14, 2011

(65) Prior Publication Data

US 2012/0118695 A1 May 17, 2012

(30) Foreign Application Priority Data

Nov. 12, 2010 (JP) .................................. 2010-253418

(51) Int. Cl.
*F16D 25/0638* (2006.01)

(52) U.S. Cl.
USPC .................. 192/85.25; 180/65.25; 192/85.29; 192/85.37; 192/106 F; 903/914

(58) Field of Classification Search
USPC .......... 192/85.25, 85.29, 85.37, 106 F, 85.27, 192/85.28
See application file for complete search history.

(56) References Cited

U.S. PATENT DOCUMENTS

| | | | | |
|---|---|---|---|---|
| 5,024,636 A | * | 6/1991 | Phebus et al. | 475/141 |
| 5,151,068 A | * | 9/1992 | Mann et al. | 192/85.37 |
| 5,687,821 A | * | 11/1997 | Lorriette | 192/85.37 |

FOREIGN PATENT DOCUMENTS

| | | |
|---|---|---|
| JP | 2007-155077 A | 6/2007 |
| JP | 2010-091083 A | 4/2010 |

* cited by examiner

*Primary Examiner* — Rodney Bonck
(74) *Attorney, Agent, or Firm* — Buchanan Ingersoll & Rooney PC (57) ABSTRACT

A clutch device for a vehicle includes an input shaft, an output shaft coaxially arranged with a rotational axis of the input shaft, first clutch plates, second clutch plates, a piston fitted to a cylindrical portion integrally formed with the output shaft or the input shaft, an elastic member arranged between the piston and the cylindrical portion, a hydraulic chamber defined by the cylindrical portion and the piston, a canceller chamber defined by the cylindrical portion and the piston to connect to an outer side of the cylindrical portion via a discharge hole formed at a portion of the cylindrical portion, the portion being located at a predetermined radial distance from the rotational axis, and a throttle hole formed in a portion of the piston to connect the hydraulic chamber to the canceller chamber, the portion being located at a radially inward side of the portion of the cylindrical portion.

5 Claims, 3 Drawing Sheets

CLUTCH DEVICE FOR VEHICLE

CROSS REFERENCE TO RELATED APPLICATIONS

This application is based on and claims priority under 35 U.S.C. §119 to Japanese Patent Application 2010-253418, filed on Nov. 12, 2010, the entire content of which is incorporated herein by reference.

TECHNICAL FIELD

This disclosure generally relates to a clutch device for a vehicle.

BACKGROUND DISCUSSION

A known clutch device is generally arranged at a drive system for a vehicle. The clutch device transmits and blocks a driving force of a drive source of the vehicle between an input shaft connected to the drive source and an output shaft connected to driving wheels of the vehicle. In such clutch device, plural first clutch plates arranged at the input shaft and plural second clutch plates arranged at the output shaft are positioned in an alternating manner with one another. A hydraulic pressure of oil is applied to a hydraulic chamber or the hydraulic pressure is released from the hydraulic chamber, thereby pressing the plural first and second clutch plates against one another. Accordingly, the first and second clutch plates arranged side by side are engaged with (connected to) one another. Consequently, the input shaft and the output shaft are rotatably connected to each other.

In the clutch device configured as described above, a driver of the vehicle may have uncomfortable sensations because of a delay in the engagement of the first and second clutch plates of the clutch device. Further, the first and second clutch plates may be worn or stuck to one another because of slippage therebetween due to the incomplete engagement. Additionally, for example, a delay in disengagement between the first and second clutch plates of the clutch device occurs or the clutch device is not released from the engaged state; therefore, the vehicle may not be appropriately brought into motion. Such defective phenomena are caused by a centrifugal force generated by the oil that should be essentially discharged from the hydraulic chamber but remains in the hydraulic chamber. For example, the hydraulic chamber is brought into rotation in a state where the oil remains in the hydraulic chamber. At this time, the centrifugal force is generated by the oil remaining in the hydraulic chamber, thereby biasing or moving a piston defining the hydraulic chamber. A canceller chamber for biasing the piston in an opposite direction of the moving direction of the piston is arranged in the clutch device disclosed, for example, in each of JP2010-91083A and JP2007-155077A (hereinafter referred to as References 1 and 2).

The clutch device disclosed in Reference 1 is a normally closed clutch. According to the clutch device according to Reference 1, when a rotary shaft is not rotating, a hydraulic oil (corresponding to the oil) is sealed in the canceller chamber by an oil discharge hole being in a closed state. Therefore, even when the rotary shaft starts rotating, a centrifugal hydraulic pressure generated by the oil remaining in a hydraulic chamber is cancelled by a centrifugal hydraulic pressure of the canceller chamber. Consequently, the clutch device is not unexpectedly brought into a connected state and is therefore maintained in a disconnected state. Meanwhile, when the rotary shaft is rotating, the oil is discharged from the canceller chamber through the oil discharge hole being in an opened state. Accordingly, the piston moves toward the canceller chamber without being affected by the centrifugal hydraulic pressure, therefore bringing the clutch device into the connected state.

The clutch device disclosed in Reference 2 is a normally closed clutch. According to the clutch device according to Reference 2, in order to bring the clutch device into a disconnected state, a hydraulic pressure of a hydraulic oil (corresponding to the oil) is applied to a hydraulic pressure canceller chamber (corresponding to the canceller chamber), thereby canceling a centrifugal hydraulic pressure generated by a centrifugal hydraulic pressure caused by the oil remaining in a hydraulic chamber. Accordingly, the clutch device is smoothly brought into the disconnected state. Meanwhile, in order to bring the clutch device into a connected state, the hydraulic pressure is applied to the hydraulic chamber, thereby moving a clutch piston toward the canceller chamber. At this time, the hydraulic pressure of the canceller chamber is released therefrom through an oil discharge passage; therefore, the clutch piston is brought into the connected state while not being affected by the hydraulic pressure of the canceller chamber.

However, the clutch device according to Reference 1 is not provided with a mechanism that surely and promptly brings the clutch device into the connected state. In addition, the clutch device according to Reference 1 includes a partition wall at which a check ball is arranged. Accordingly, the clutch device has a complex configuration, resulting in an increase of costs for the clutch device. Likewise, the clutch device according to Reference 2 is not provided with a mechanism that surely and promptly brings the clutch device into the connected state. In addition, for example, in a state where a drive source of the vehicle is in a stopped state, the clutch device according to Reference 2 is configured so that the oil is released from the canceller chamber. Therefore, for example, when the drive source is returned from the stopped state into operation, a predetermined time is required until the canceller chamber is filled with the oil. Accordingly, the centrifugal hydraulic pressure generated by the oil remaining in the hydraulic pressure may not be cancelled by the centrifugal hydraulic pressure of the canceller chamber until the predetermine time elapses. Consequently, the clutch device may not be promptly brought into the disconnected state when the drive source is suddenly switched from the stopped state into operation at high speed.

A need thus exists for a clutch device for a vehicle, which is not susceptible to the drawbacks mentioned above.

SUMMARY

According to an aspect of this disclosure, a clutch device for a vehicle includes an input shaft rotationally connected to a drive source, an output shaft coaxially arranged with a rotational axis of the input shaft, a case supporting the input shaft and the output shaft by a bearing along the rotational axis so that the input shaft and the output shaft are rotatable, a plurality of first clutch plates movably engaged with one of the input shaft and the output shaft along the rotational axis, a plurality of second clutch plates arranged in an alternating manner with the first clutch plates and being engageable with and separable from the first clutch plates, the second clutch plates being movably engaged with the other one of the input shaft and the output shaft along the rotational axis, a piston slidably fitted to a cylindrical portion along the rotational axis, the cylindrical portion being integrally formed with the output shaft or the input shaft, the piston including a pressing portion pressing the first clutch plates and the second clutch plates, an elastic member arranged between the piston and the cylindrical portion, the elastic member biasing the piston toward the first clutch plates and the second clutch plates and pressing the first clutch plates and the second clutch plates by the pressing portion to engage the first clutch plates and the second clutch plates with one another, a hydraulic chamber defined by the cylindrical portion and a first end surface of the piston and arranged between the cylindrical portion and the first end surface, the hydraulic chamber receiving a hydraulic pressure of oil, the hydraulic pressure allowing the piston to separate from the first clutch plates and the second clutch plates against a biasing force of the elastic member, an accommodating chamber defined by the cylindrical portion and a second end surface of the piston to accommodate the elastic member, a canceller chamber defined by the cylindrical portion and the second end surface of the piston and arranged between the cylindrical portion and the second end surface, the canceller chamber connecting to an outer side of the cylindrical portion via a discharge hole formed at a portion of the cylindrical portion, the portion being located at a predetermined radial distance from the rotational axis, the canceller chamber including a first portion constituting a portion of the accommodating chamber, a second portion extending from the first portion in a direction toward the first clutch plates, and a third portion extending in a direction separating from the rotational axis, and a throttle hole formed in a portion of the piston to connect the hydraulic chamber to the canceller chamber, the portion being located at a radially inward side of the portion of the cylindrical portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
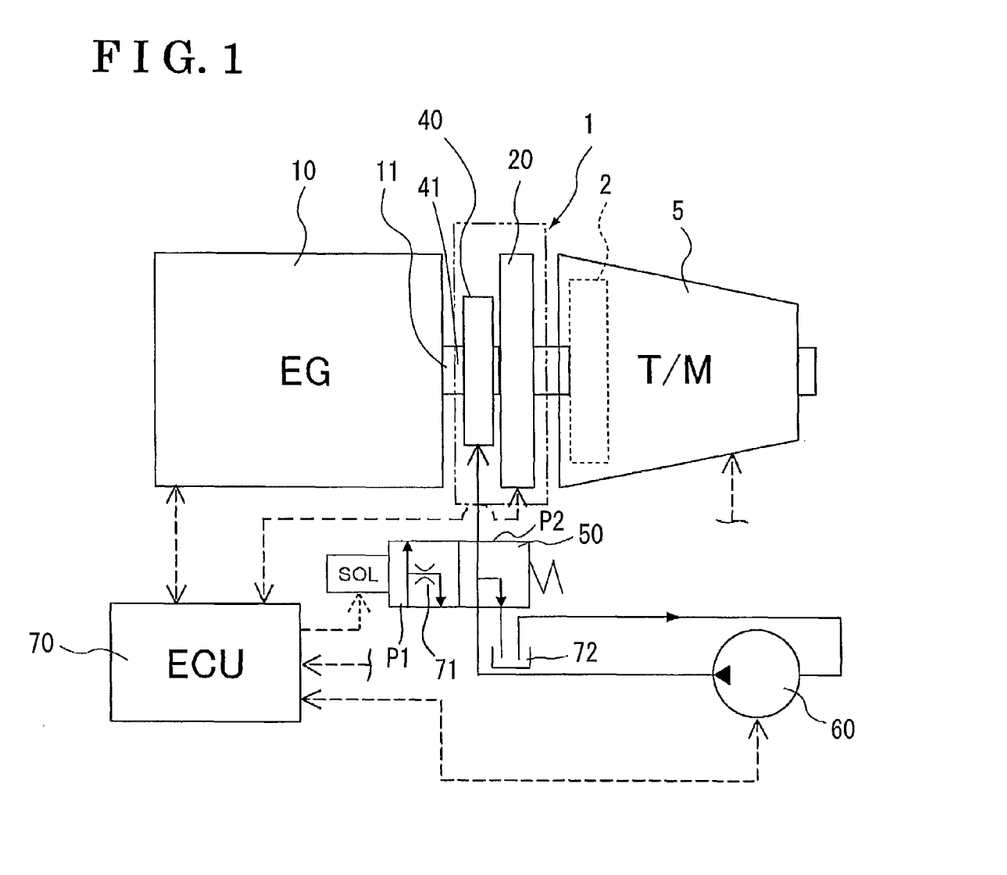
FIG. 1 is a schematic view of a drive system for a hybrid vehicle according to an embodiment disclosed here.

An embodiment of this disclosure, applied to a vehicle, particularly, a hybrid vehicle will be explained as follows with reference to the attached drawings. FIG. 1 is a schematic view of a drive system 1 for the hybrid vehicle according to the embodiment. Solid arrows in FIG. 1 illustrate hydraulic passages establishing connections among systems and dashed arrows in FIG. 1 illustrate lines of control signals. In addition, an electromagnetic switching valve 50 (solenoid valve that is shown as a SOL in FIG. 1), an electric oil pump 60, and a reservoir 72 are illustrated as separate members from an electric motor 20 in FIG. 1. However, the electromagnetic switching valve 50, the electric oil pump 60, and a clutch device 40 are actually integrally formed with the electric motor 20 and the reservoir 72 is arranged in a front case 6 and a case 3 (see FIG. 2). Moreover, respective directions in which an engine 10 (hereinafter referred to as an EG 10) and an automatic transmission device 5 (hereinafter referred to as a T/M 5) of the drive system 1 are positioned are defined as front and rear sides of the hybrid vehicle in the embodiment.

Figure 2:
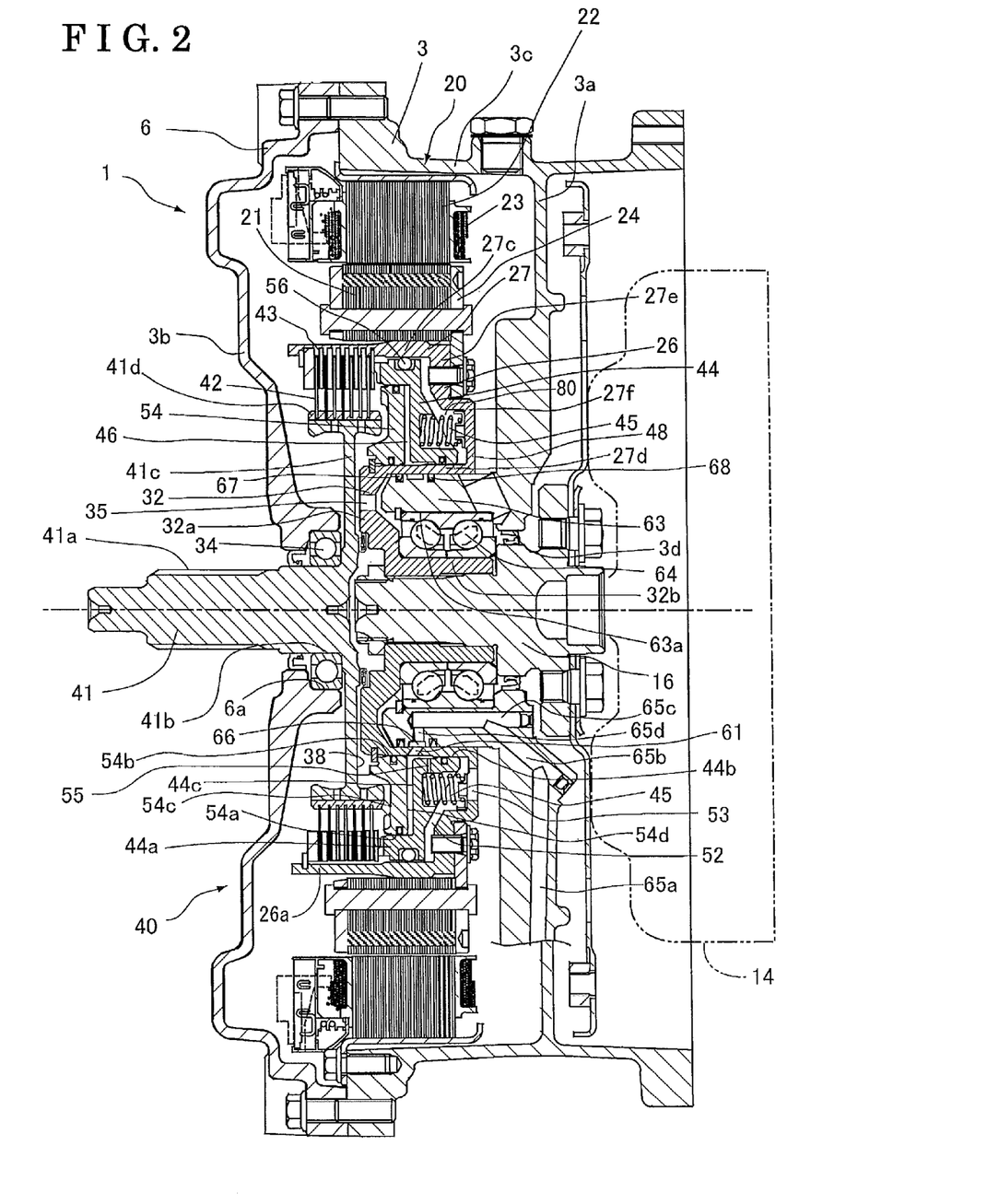
FIG. 2 is a cross-sectional view of a clutch device for a vehicle according to the embodiment disclosed here.

As illustrated in FIG. 2, the case 3 includes an outer circumferential wall portion 3c and a rear wall portion 3a. The outer circumferential wall portion 3c forms an outer shape of the case 3. The rear wall portion 3a is formed between the electric motor 20 and a torque converter 2 of the T/M 5. The case 3 is configured so that the outer circumferential wall portion 3c is extended by a predetermined length from the rear wall portion 3a toward the T/M 5, thereby covering a portion of the torque converter 2. The case 3 is fixed by a bolt to a case covering other portions of the torque converter 2, thereby forming a case of the T/M 5.

The front case 6, corresponding to a cover portion of the case 3 and forming a front wall portion 3b of the case 3, is arranged in the vicinity of the EG 10. The front case 6 is fixed to the case 3 by bolts. A through-hole 6a is formed in a center portion of the front wall portion 3b of the front case 6 constituting a portion of the case 3. An input shaft 41 of the clutch device 40 according to the embodiment is supported by the center portion of the front wall portion 3b so as to penetrate through the through-hole 6a. A ball bearing 34 is arranged between the through-hole 6a and the input shaft 41 so that the input shaft 41 is rotatably supported by the front case 6.

As illustrated in FIG. 1, the EG 10 serving as a drive source of the hybrid vehicle and the electric motor 20 serving as a rotating electric machine are connected to each other in series via the clutch device 40 serving as a wet multi-plate clutch. The clutch device 40 establishes a mechanical connection between the EG 10 and the electric motor 20 to thereby transmit torque of the EG 10 to the T/M 5. Further, the clutch device 40 disconnects the EG 10 from the electric motor 20 to thereby block the transmission of the torque of the EG 10 to the T/M 5. The T/M 5 is connected to the electric motor 20 in series. Driving wheels of the hybrid vehicle are connected to the T/M 5 via a differential device. The T/M 5 includes a transmission and the torque converter 2. An output shaft of the torque converter 2 is connected to an input shaft of the transmission.

As illustrated in FIGS. 1 and 2, the electric motor 20 and the torque converter 2 are rotatably connected to each other by an output shaft 26 serving as a first shaft of the clutch device 40 and by a centerpiece member 16 of the torque converter 2. The centerpiece member 16 corresponds to an input shaft of the torque converter 2. The centerpiece member 16 and the output shaft 26 are coaxially arranged with the input shaft 41 serving as a second shaft of the clutch device 40. Further, the centerpiece member 16 is connected to a front cover 14 of the torque converter 2, thereby integrally rotating with the front cover 14. Accordingly, a pump impeller connected to the front cover 14 and arranged within the torque converter 2 is rotated by the rotation of the front cover 14 together with the centerpiece member 16. Consequently, an oil flow is generated by the pump impeller and a turbine liner connected to the input shaft of the transmission is rotated by the oil flow. As a result, a rotating force of the turbine liner is transmitted to the input shaft of the transmission. The output shaft 26, the centerpiece member 16, and a rotational axis of the front cover 14 are arranged coaxially with the input shaft of the transmission.

The EG 10 is a general internal combustion engine generating a driving force by means of carbon fuel. However, the EG 10 is not limited to the internal combustion engine and may be a different type of a drive source as long as the drive source drives a rotational shaft such as the input shaft 41, the output shaft 26, and the like. In addition, the electric motor 20 is a synchronous motor; however, the electric motor 20 is not limited to the synchronous motor and may be a different type of a motor. The T/M 5 is a general automatic transmission provided with a planetary gear mechanism (the transmission will be hereinafter referred to as a planetary gear automatic transmission); however, the T/M 5 is not limited to the planetary gear automatic transmission and may be a different type of a transmission. The clutch device 40 is a normally closed clutch mechanically connecting the EG 10 to the electric motor 20 under a normal operating state.

As illustrated in FIG. 1, the electromagnetic switching valve 50 is a two-position valve having three ports (will be referred to as first, second, and third ports). The first port connects to a hydraulic chamber 46 of the clutch device 40 through hydraulic lines 65a, 65b, and 65c, and 65d. The second port connects to a discharge port of the electric oil pump 60 and the third port connects to the reservoir 72. A suction port of the electric oil pump 60 consistently connects to the reservoir 72.

In a case where the electromagnetic switching valve 50 is in a first operation position P1 illustrated in FIG. 1, the discharge port of the electric oil pump 60 is connected to the hydraulic chamber 46 and the reservoir 72 is connected via an orifice 71 to the discharge port of the electric oil pump 60 and to the hydraulic chamber 46. At this time, the electric pump 60 suctions the oil in the reservoir 72 and discharges the oil via the electromagnetic switching valve 50 to the hydraulic chamber 46; therefore, the clutch device 40 is brought into a disconnected state. In such state, a hydraulic pressure of the oil being discharged from the electric oil pump 60 to the hydraulic chamber 46 is not drastically reduced and is sufficiently applied thereto because a passage connecting from the hydraulic chamber 46 to the reservoir 72 is limited by the orifice 71.

Meanwhile, in a case where the electromagnetic switching valve 50 is in a second operation position P2 illustrated in FIG. 1, the hydraulic chamber 46 and the discharge port of the electric oil pump 60 are connected to the reservoir 72 and the oil (hydraulic pressure) of the hydraulic chamber 46 is discharged to the reservoir 72; therefore, the clutch device 40 is brought into a connected state. At this time, the electric oil pump 60 is not in operation.

The electromagnetic switching valve 50 and the electric oil pump 60 are electrically connected to a controller (ECU) 70. The ECU 70 drives the electromagnetic switching valve 50 and the electric oil pump 60; thereby, the appropriate hydraulic pressure of the oil is applied to the clutch device 40. As a result, the clutch device 40 is appropriately controlled to the connected and disconnected states.

Further, the ECU 70 controls the rotation of the EG 10 or the electric motor 20, thereby bringing the hybrid vehicle into motion. Furthermore, the ECU 70 is connected to an electromagnetic solenoid operating a shift valve of the T/M 5, thereby controlling the operation of the T/M 5 in accordance with a rotating speed of the EG 10, a driving speed of the hybrid vehicle, and a position of the shift valve.

Next, details of the clutch device 40 will be explained as follows with reference to FIGS. 2 and 3. The clutch device 40 includes the input shaft (second shaft) 41 rotatably connected to the EG 10, and the output shaft (first shaft) 26 integrally connected to a rotor 21 having a rotational axis coaxially arranged with the output shaft 26.

The clutch device 40 further includes plural separate plates 43 corresponding to first clutch plates, and plural friction plates 42 corresponding to second clutch plates. The separate plates 43 are engaged with a radially-outward engagement portion 26a of the output shaft 26. The friction plates 42 are engaged with a radially-inward engagement portion 41d of the input shaft 41.

Furthermore, the clutch device 40 includes the case 3, the front case 6, a cylindrical portion 48 integrally formed with the output shaft 26, and a piston 44 having a pressing portion 44a pressing the plural separate plates 43 and the plural friction plates 42 against one another. The case 3 forms a case housing the electric motor 20, the separate plates 43, and the friction plates 42, and the like. The piston 44 is fitted to the cylindrical portion 48 so as to slide (move) along a rotational axis of the input shaft 41. The piston 44 includes a first axial end surface 44c (first end surface serving as a pressure surface) and a second axial end surface (second end surface) facing the EG 10 and the T/M 5, respectively.

Moreover, the clutch device 40 includes coil springs 45 serving as elastic members biasing the piston 44 toward the plural separate plates 43 and the plural friction plates 42, the hydraulic chamber 46 defined between the first axial end surface (first end surface) 44c of the piston 44 and the cylindrical portion 48, and a canceller chamber 52 defined between the second axial end surface (second end surface) of the piston 44 and the cylindrical portion 48. The coil springs 45 are arranged between the second axial end surface of the piston 44 and the cylindrical portion 48 in a compressed manner.

The input shaft 41 is rotatably connected to an output shaft 11 of the EG 10 via a flywheel and a damper that absorbs rotational vibrations caused by the EG 10 (see FIG. 1). As illustrated in FIG. 2, the input shaft 41 includes a fixed portion 41a fixed to the damper, a connecting portion 41b rotatably supported by the through-hole 6a of the front wall portion 3b of the front case 6, and an annular plate portion 41c having the radially-inward engagement portion 41d with which the friction plates 42 are engaged. The radially-inward engagement portion 41d is formed at a radially outward side of the annular plate portion 41c. The position of the front wall portion 3b by which the input shaft 41 is supported will be hereinafter referred to as an input-shaft side.

Figure 3:
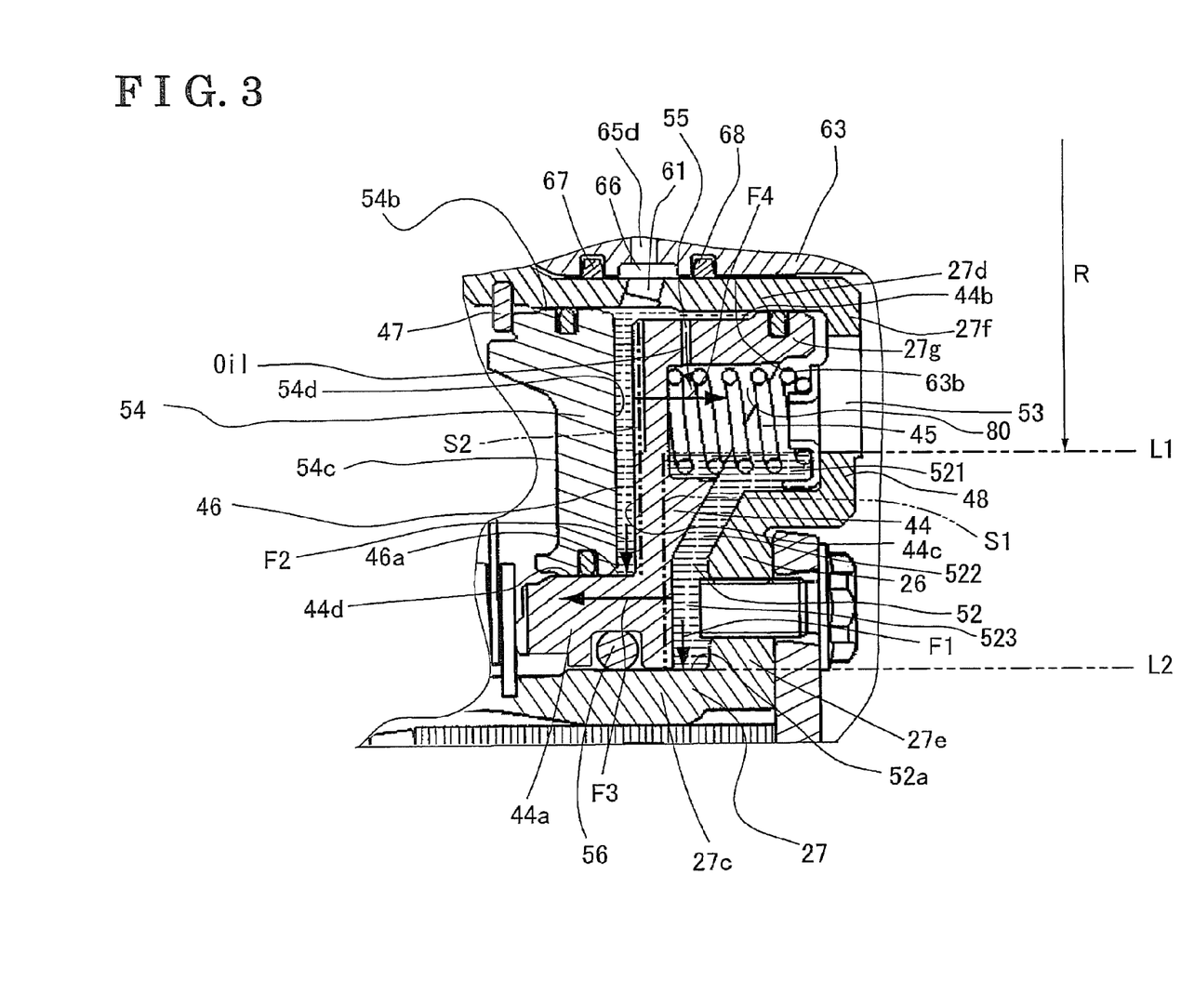
FIG. 3 is an enlarged view of a portion of the clutch device illustrated in FIG. 2.

As illustrated in FIGS. 2 and 3, the annular plate portion 41c is formed into an annular shape radially extending relative to the input shaft 41. The annular plate portion 41c has a wall surface 38 facing the T/M 5.

As described above, the radially-inward engagement portion 41d is formed at the radially outward side of the annular plate portion 41c. The radially-inward engagement portion 41d extends along the rotational axis of the input shaft 41. The plural friction plates 42 having annular shapes are engaged with the radially-inward engagement portion 41d so as to be restricted from rotating and so as to slide (move) along the rotational axis of the input shaft 41.

The output shaft 26 is rotatably connected to the centerpiece member 16 corresponding to the input shaft of the torque converter 2. The centerpiece member 16 is rotatably supported by a through-hole 3d formed in the rear wall portion 3a of the case 3. The position of the rear wall portion 3a by which the centerpiece member 16 connected to the output shaft 26 is supported will be hereinafter referred to as an output-shaft side.

The output shaft 26 has a substantially reversed S-shape in axial cross section seen in FIG. 2. A radially-outward opened portion 27 having an opening facing the EG 10 is formed at a radially outward side of the output shaft 26. A radially-inward opened portion 32 having an opening facing the T/M 5 is formed at a radially inward side of the output shaft 26. The radially-outward opened portion 27 is formed by a radially-outward wall portion 27c that has an end portion at the input-shaft side, a radially-inward wall portion 27d, and bottom wall portions 27e and 27f having stepped portions. The radially-outward opened portion 27 constitutes a portion of the cylindrical portion 48. In particular, the cylindrical portion 48 is formed by the radially-outward opened portion 27, a fixed member 54 that will be explained below, and an annular inner circumferential surface of the pressing portion 44a of the piston 44. The plural separate plates 43 having annular shapes are engaged with the radially-outward engagement portion 26a that is formed at an inner circumferential surface of the radially-outward wall portion 27c so as to be positioned at the end portion of the input-shaft side of the radially-outward wall portion 27c. The separate plates 43 engaged with the radially-outward engagement portion 26a are restricted from rotating while being slidable along the rotational axis of the input shaft 41.

As illustrated in FIG. 2, the plural friction plates 42 engaged with the radially-inward engagement portion 41d formed at the radially outward side of the annular plate portion 41c are positioned in an alternating manner with the plural separate plates 43 so as to engage therewith and separate therefrom. For example, the separate plates 43 and the friction plates 42 arranged in an alternating manner are pressed against one another toward the input-shaft side along the rotational axis of the input shaft 41. Therefore, the separate plates 43 move (slide) toward the input-shaft side; thereby, friction plate members attached to both axial surfaces of each of the friction plates 42 are pressed against the separate plates 43 so as to be engaged therewith. As a result, the input shaft 41 and the output shaft 26 are rotatably connected to each other, thereby rotating the output shaft 11 of the EG 10 together with the input shaft of the T/M 5.

As illustrated in FIG. 2, the radially-inward opened portion 32 formed at the radially inward side of the output shaft 26 includes a fixed portion 32b and a connecting portion 32a. The fixed portion 32b is spline-fitted to the centerpiece member 16 so as to integrally rotate therewith. The fixed portion 32b has an end portion located at the input-shaft side. The connecting portion 32a having an axial surface facing the input-shaft side extends radially outward from the end portion of the fixed portion 32b. As described above, the wall surface 38 of the annular plate portion 41c faces the T/M 5 (the output-shaft side). The axial surface of the connecting portion 32a and the wall surface 38 of the annular plate portion 41c are arranged so as to face each other in a state where a predetermined clearance is generated between the axial surface and the wall surface 38.

As illustrated in FIG. 2, a protruding portion 63 having an annular shape is formed at the rear wall portion 3a of the case 3 so as to protrude toward a space surrounded by the radially-inward opened portion 32 and the radially-inward wall portion 27d of the radially-outward opened portion 27. The space has an opening portion facing the T/M 5. An inner circumferential surface of the radially-inward wall portion 27d is fitted to an outer circumferential surface 63b of the protruding portion 63. In addition, a ball bearing 64 is arranged between an inner circumferential surface 63a of the protruding portion 63 and the fixed portion 32b of the radially-inward opened portion 32, thereby smoothly rotating the protruding portion 63 relative to the radially-inward opened portion 32.

As illustrated in a lower side of the FIG. 2, the hydraulic lines 65a, 65b, 65c, and 65d connecting to one another are formed in the rear wall portion 3a and the protruding portion 63 so as to connect the electromagnetic switching valve 50 to the hydraulic chamber 46 as described above. The hydraulic line 65a is a connecting passage connecting to the electromagnetic switching valve 50. The hydraulic line 65d is a connecting passage connecting to the hydraulic chamber 46. The hydraulic line 65d connects to an oil passage 66 cut in the entire outer circumferential surface 63b of the protruding portion 63. The oil is supplied to and discharged from the oil passage 66 to the hydraulic chamber 46 through an inflow port 61 that will be described below. The inflow port 61 is formed in the radially-inward wall portion 27d of the radially-outward opened portion 27 so as to penetrate through the radially-inward wall portion 27d. As illustrated in FIGS. 2 and 3, grooves are formed at both sides of the oil passage 66 in the direction of the rotational axis of the input shaft 41. Annular rings 67 and 68, for example, made of resin are arranged in the grooves, respectively, thereby minimizing leakage of the oil from the oil passage 66. The annular rings 67 and 68 are designed so that a predetermined volume of the oil is allowed to leak from the oil passage 66 in order to supply a portion of the oil to an inner space of the radially-inward opened portion 32 for the purpose of lubricating the ball bearing 64 and the like that are arranged in the inner space. For example, the oil is supplied to the inner space and the inner space is sufficiently filled with the oil (lubrication oil). Then, the oil outflows from the inner space through an oil bore 35 formed in the connecting portion 32a (see FIG. 2). Afterward, the oil is supplied to the wall surface 38 of the annular plate portion 41c that faces the connecting portion 32a in a state where the predetermine clearance is generated between the connecting portion 32a and the wall surface 38. Thereafter, the oil supplied to the wall surface 38 flows to a radially outward side of the annular plate portion 41c by a centrifugal force acting on the oil, therefore lubricating the friction plates 42 and the separate plates 43. Three of the oil bores 35 are arranged at substantially equal intervals on a circle about a rotational axis of the connecting portion 32a.

As illustrated in FIG. 2, the piston 44 is accommodated in the cylinder portion 48. A through-hole 44b is formed in a center portion of the piston 44 formed into a substantially annular shape. The piston 44 is axially slidably attached to an outer circumferential surface of the radially-inward wall portion 27d of the radially-outward opened portion 27 via an O-ring that is made of rubber or the like so as to be arranged at the piston 44 (the radially-inward wall portion 27d constitutes a portion of the cylindrical portion 48). The through-hole 44b corresponding to an inner diameter portion of the piston 44 as seen in an axial cross section has a large thickness at the output-shaft side. The thickness gradually decreases toward a radially outward side of the piston 44. The piston 44 includes the pressure surface 44c at the input-shaft side. The pressure surface 44c has a flat surface perpendicular to the rotational axis of the input shaft 41 (see FIGS. 2 and 3). The piston 44 further includes the pressing portion 44a that is formed at a radially outward side of the pressure surface 44c so as to protrude axially toward the input-shaft side. The pressing portion 44a is formed so as to include a substantially annular portion. As illustrated in FIG. 3, a slide surface 44d is formed at an inner circumferential surface of the annular portion of the pressing portion 44a. The slide surface 44d is fittable to an outer circumferential surface 54a (will be described below, see FIG. 2) of the fixed member 54 (constituting a portion of the cylindrical portion 48) so that the piston 44 is axially slidable. As illustrated in FIG. 3, an outer circumferential surface of the piston 44 is axially slidably fitted to the inner circumferential surface of the radially-outward wall portion 27c of the radially-outward opened portion 27 (cylindrical portion 48) in a liquid tight manner via an O-ring 56 made of rubber or the like.

As described above, the fixed member 54 constitutes a portion of the cylindrical portion 48. The fixed member 54 is attached to the outer circumferential surface of the radially-inward wall portion 27d of the radially-outward opened portion 27 constituting a portion of the cylindrical portion 48, thereby being integrally fixed to the radially-inward wall portion 27d.

As illustrated in FIGS. 2 and 3, the fixed member 54 formed to have a substantially annular shape includes the outer circumferential surface 54a, an inner circumferential surface 54b, an input-shaft-side flat surface 54c, and an output-shaft-side flat surface 54d. A fixing ring 47 such as a C-ring is positioned at the input-shaft side of the fixed member 54 so as to be fitted to the outer circumferential surface of the radially-inward wall portion 27d, thereby restricting the fixed member 54 from axially moving toward the input-shaft side.

An O-ring made of rubber is arranged at the inner circumferential surface 54b of the fixed member 54, thereby sealing the hydraulic chamber 46 in a liquid tight manner. The outer circumferential surface 54a of the fixed member 54 is fitted to the slide surface 44d corresponding to the inner circumferential surface of the pressing portion 44a. An O-ring made of rubber is arranged at the outer circumferential surface 54a, thereby sealing the hydraulic chamber 46 in a liquid tight manner.

The hydraulic chamber 46 is defined and surrounded by the output-shaft-side flat surface 54d (cylindrical portion 48) of the fixed member 54, the pressure surface 44c (first end surface) of the piston 44, the slide surface 44d (cylindrical portion 48) of the pressing portion 44a, and the outer circumferential surface of the radially-inward wall portion 27d (cylindrical portion 48) of the radially-outward opened portion 27. As described above, the hydraulic chamber 46 is connected to the inflow port 61 connecting to the electric oil pump 60 and the reservoir 72 via the oil passage 66, the hydraulic passages 65d, 65c, 65b, and 65a, and the electromagnetic switching valve 50. Three of the inflow ports 61 are formed in the radially-inward wall portion 27d so as to penetrate therethrough. For example, the three inflow ports 61 are arranged at equal intervals in a circle of the radially-inward wall portion 27d; however, the number of inflow ports 61 is not limited to three. The number of inflow ports 61 may be arbitrarily determined in consideration for a magnitude of the hydraulic pressure of the oil to be supplied to the hydraulic chamber 46 or in consideration for a discharge volume of the oil to be discharged from the hydraulic chamber 46.

The electromagnetic switching valve 50 is operated to be switched between the first operation position P1 for supplying the oil (hydraulic pressure) to the hydraulic chamber 46, and the second operation position P2 for discharging the oil (reducing the hydraulic pressure) from the hydraulic chamber 46. The electromagnetic switching valve 50 is switched to the second operation position P2, thereby allowing the hydraulic chamber 46 to connect to the outer air through the inflow ports 61.

As illustrated in FIGS. 2 and 3, the coil springs 45 serving as the elastic members are arranged in a compressed manner in an accommodating chamber 80 defined by the second axial end surface (second end surface) of the piston 44 and a portion 27g of the radially-outward opened portion 27 (cylindrical portion 48). According to the embodiment, the twenty-eight coil springs 45 are arranged at equal intervals on a circle about a rotational axis of the piston 44. The coil springs 45 bias the piston 44 toward the input-shaft side and the pressing portion 44a of the piston 44 presses the friction plates 42 and the separate plates 43 against one another by a predetermined load. Cylindrical holes accommodating the twenty-eight coil springs 45 and having diameters slightly larger than respective outer diameters of the coil springs 45 are formed at the second axial end surface (an output-shaft-side surface) of the piston 44. The coil springs 45 are inserted in the respective cylindrical holes so as to be locked thereat. According to the embodiment, the twenty-eight coil springs 45 are arranged in the cylindrical holes; however, the number of coil springs 45 is not limited to twenty-eight. In addition, any number of coil springs 45 may be arranged in the cylindrical holes as long as the coil springs 45 may exert biasing forces to thereby engage the friction plates 42 and the separate plates 43 with one another and to thereby press the friction plates 42 and the separate plates 43 against one another uniformly along an entire circumference of each of the annular shapes of the friction plates 42 and the separate plates 43.

As illustrated in FIG. 3, the canceller chamber 52 is formed between the second axial end surface (second end surface) of the piston 44 and the cylindrical portion 48. The canceller chamber 52 includes a first portion 521 constituting a portion of the accommodating chamber 80, a second portion 522 extending obliquely from the first portion 521 in a direction toward the separate plates 43, and a third portion 523 extending in a direction separating from the rotational axis of the input shaft 41. In addition, the canceller chamber 52 formed between the second axial end surface of the piston 44 and the cylindrical portion 48 is positioned radially outward relative to a predetermined radius R having a predetermined radial distance from the rotational axis of the input shaft 41. In other words, the predetermined radius R determines an inner diameter of the canceller chamber 52. For example, the predetermined radius R is set arbitrarily; thereby, a first moving force F3 by which the piston 44 is moved toward the hydraulic chamber 46 may be set. The first moving force F3 is caused by a first centrifugal hydraulic pressure generated by a centrifugal force acting on the oil stored in the canceller chamber 52. According to the embodiment, the first moving force F3 is set to be equal to a second moving force F4 by which the piston 44 is moved toward the canceller chamber 52. The second moving force F4 is caused by a second centrifugal hydraulic pressure generated by a centrifugal force acting on the oil remaining in the whole hydraulic chamber 46.

The first and second centrifugal hydraulic pressures are calculated by first and second biasing forces indicated by arrows F1 and F2 that are illustrated in FIG. 3 (the first and second biasing forces will be hereinafter referred to as the first and second biasing forces F1 and F2, respectively). The oil stored in the canceller chamber 52 and having a predetermined mass is rotated about the rotational axis of the input shaft 41; thereby, the first biasing force F1 is applied to an inner circumferential surface 52a of a radially outward portion of the canceller chamber 52 (the inner circumferential surface 52a will be hereinafter referred to as a radially-outward inner circumferential surface). The oil stored in the hydraulic chamber 46 and having a predetermined mass is rotated about the rotational axis of the input shaft 41; thereby, the second biasing force F2 is applied to an inner circumferential surface 46a of a radially outward portion of the hydraulic chamber 46 (the inner circumferential surface 46a will be hereinafter referred to as a radially-outward inner circumferential surface). The oil pressing the radially-outward inner circumferential surface 52a by the first biasing force F1 is an incompressible fluid while the oil pressing the radially-outward inner circumferential surface 46a by the second biasing force F2 is the incompressible fluid. Therefore, the oil of the canceller chamber 52 presses an inner wall surface of the canceller chamber 52 by means of the first centrifugal hydraulic pressure without change of the volume while being in contact with the inner wall surface. In addition, the oil of the hydraulic chamber 46 presses an inner wall surface of the hydraulic chamber 46 by means of the second centrifugal hydraulic pressure without change of the volume while being in contact with the inner surface. In such case, the first centrifugal hydraulic pressure uniformly pressing the inner wall surface of the canceller chamber 52 may be obtained by dividing the first biasing force F1 by an area of the inner wall surface. Likewise, the second centrifugal hydraulic pressure uniformly pressing the inner wall surface of the hydraulic chamber 46 may be obtained by dividing the second biasing force F2 by an area of the inner wall surface.

As a result, the first moving force F3 caused by the first centrifugal hydraulic pressure and moving the piston 44 toward the hydraulic chamber 46 is obtained by multiplying the first centrifugal hydraulic pressure by an annular projected area S1 (see FIG. 3) of the second axial end surface of the piston 44 that is pressed by the oil of the canceller chamber 52 when the canceller chamber 52 is rotating about the rotational axis of the input shaft 41.

Meanwhile, the second moving force F4 caused by the second centrifugal hydraulic pressure and moving the piston 44 toward the canceller chamber 52 is obtained by multiplying the second centrifugal hydraulic pressure by an annular projected area S2 (see FIG. 3) of the first axial end surface 44c of the piston 44 that is pressed by the oil of the hydraulic chamber 46 when the hydraulic chamber 46 is rotating about the rotational axis of the input shaft 41.

In addition, as illustrated in FIGS. 2 and 3, a discharge hole 53 is formed in the bottom wall portion 27f of the radially-outward opened portion 27 (cylindrical portion 48) so as to penetrate through the bottom wall portion 27f. The discharge hole 53 connects to an outer side of the cylindrical portion 48 forming the canceller chamber 52. The position of the predetermine radius R determining the size of the canceller chamber 52 corresponds to a maximal radially outward position of the discharge hole 53 from the rotational axis of the input shaft 41 (see FIG. 3). For example, when the canceller chamber 52 rotates about the rotational axis of the input shaft 41 under a state where the oil is supplied to the canceller chamber 52, the oil flows radially inward from the radially outward portion of the canceller chamber 52 to the discharge hole 53. Thereafter, the oil supplied to the discharge hole 53 is sequentially discharged therefrom to the outer side of the cylindrical portion 48. As described above, the maximal radially outward position of the discharge hole 53 determines the size of the canceller chamber 52 and corresponds to the position of the predetermine radius R.

As illustrated in FIG. 3, a throttle hole 55 connecting to the hydraulic chamber 46 for supplying the oil from the hydraulic chamber 46 to the canceller chamber 52 is formed in the piston 44 so as to penetrate therethrough. The throttle hole 55 is positioned closer to the rotational axis of the input shaft 41 than the discharge hole 53 that is located at the predetermined distance (of the predetermined radius R) from the rotational axis of the input shaft 41. The throttle hole 55 penetrates through the piston 44 so as to extend from an inner circumferential surface of the through-hole 44b of the piston 44 to any of the twenty-eight cylindrical holes formed in the output-shaft-side surface (the second axial surface) of the piston 44. The coil springs 45 are arranged in the twenty-eight cylindrical holes of the piston 44. A diameter of the throttle hole 55 may be set arbitrarily so that the hydraulic pressure of the oil to be supplied to the hydraulic chamber 46 may be maintained in an appropriate manner without largely decreasing. In addition, according to the embodiment, three of the throttle holes 55 are arranged at equal intervals around the rotational axis of the input shaft 41. Alternatively, according to the embodiment, the number of throttle holes 55 may be two or three or the number of throttle holes 55 may range from four to twenty-eight. In addition, the throttle holes 55 do not need to be arranged at equal intervals around the rotational axis and may be arranged in an arbitrary manner. Moreover, each of the throttle holes 55 may be arranged in any position as long as the throttle hole 55 is positioned at a radially inward side of the discharge hole 53 that is located at the predetermined distance (of the predetermined radius R) from the rotational axis of the input shaft 41. For example, the throttle hole 55 may penetrate through the piston 44 so as to extend from the pressure surface 44c to a radially inward portion of the accommodating chamber 80 of the canceller chamber 52 (for example, the radially inward portion includes the cylindrical hole in which the coil spring 45 is arranged).

Next, the electric motor 20 serving as the rotating electric machine will be explained with reference to FIG. 2. The electric motor 20 formed by a three-phase alternating current motor is arranged at a radially outward side of the radially-outward opened portion 27 formed at the output shaft 26. The electric motor 20 includes the rotor 21 formed in a cylindrical shape, a stator 22 arranged at a radially outward side of the rotor 21 and facing the rotor 21, and coils 23 wound around protruding portions of the stator 22. The stator 22 is formed by layered silicone steel plates. The rotor 21 is configured so as to be rotated relative to the stator 22 by a magnetic repelling force or a magnetic attractive force generated between the stator 22 and the rotor 21.

A radially outward portion of the stator 22 is fixed to an inner circumferential surface of the outer circumferential wall portion 3c of the case 3. The rotor 21 includes an axial end surface facing the output-shaft side. Plate members 24 are formed at the axial end surface of the rotor 21 so as to extend radially inwardly along of the axial end surface. The bottom wall portion 27e formed at the output shaft 26 has an axial end surface facing the output-shaft side. The aforementioned plate members 24 of the rotor 21 are fixed to the axial end surface of the bottom wall portion 27e by bolts; thereby, the electric motor 20 is configured so that only the rotor 21 integrally rotates with the output shaft 26. The coils 23 are electrically connected to the ECU 70. The ECU 70 controls the volume of electric power to be fed to the coils 23 in accordance with signals from sensors or controls feeding of the electric power to the coils 23 in accordance with the signals. The sensors detecting various states are a vehicle speed sensor, a throttle position sensor, a shift position sensor, and the like.

Next, operation of the drive system 1 according to the embodiment will be explained as follows. For example, in a state where the hybrid vehicle is not in motion, a driver of the hybrid vehicle turns on an ignition switch and presses an accelerator pedal (when the driver presses the accelerator pedal, an opening angle of a throttle valve is small). Then, the EG 10 starts operating. That is, the driver presses the accelerator pedal in order to bring the hybrid vehicle into motion; thereafter, the opening angle of the throttle valve becomes larger than a predetermined opening angle. Then, a fuel injection device is brought into operation and a spark plug is ignited. In addition, an output shaft of a starter motor fixed to the case 3 is driven. Accordingly, an outer ring gear of the flywheel engaging with the output shaft of the starter motor is brought into rotation along with the flywheel and the output shaft 11 of the EG 10, therefore starting the operation of the EG 10. Alternatively, according to the embodiment, the EG 10 may start operating when the driver presses the accelerator pedal instead of when the driver turns on the ignition switch as described above.

When the EG 10 starts operating, an electric current is applied to the electric motor 20 and the electric motor 20 therefore functions as a drive motor. At this time, the clutch device 40 is in the connected state. Therefore, the driving force of the EG 10 and a driving force of the electric motor 20 are summed up and the driving forces are transmitted via the output shaft 26 to the torque converter 2. Afterward, the driving forces are multiplied by a predetermine torque ratio in the torque converter 2, therefore being transmitted to the input shaft of the T/M 5. As a result, the hybrid vehicle is brought into motion.

For example, in a state where the hybrid vehicle is being driven at high speed, the electric motor 2 is driven under no load (under a condition where the driving force output from the electric motor 2 is controlled so as to offset torque generated by a counter electromotive force occurring at the electric motor 2); therefore, the electric motor 2 idles. As a result, the hybrid vehicle is being in motion by the driving force of the EG 10 in a state where the clutch device 40 is maintained in the connected state.

On the other hand, for example, in a state where the driver decelerates the hybrid vehicle, the clutch device 40 is brought into the disconnected state and the EG 10 is mechanically disconnected from the T/M 5. Under such condition, the electric power is effectively regenerated by the electric motor 2 without being affected by a braking effect generated by the EG 10.

Next, behaviors of the oil under operating states of the clutch device 40 depending on the aforementioned operating conditions of the drive system 1 will be described as follows. First, a movement of the hybrid vehicle during the deceleration under a condition where the clutch device 40 is in the disconnected state will be explained.

The electromagnetic switching valve 50 connecting to the hydraulic chamber 46 is firstly driven to thereby switch a circuit of the operation position P2 to a circuit of the operation position P1 in order to bring the clutch device 40 into the disconnected state. Then, the electric oil pump 60 is driven and controlled by the ECU 70 so as to apply a predetermined hydraulic pressure of the oil to the hydraulic chamber 46 via the electromagnetic switching valve 50 and the inflow ports 61 and so as to apply the predetermined hydraulic pressure of the hydraulic chamber 46 through the throttle holes 55 to the canceller chamber 52 that is connected to the hydraulic chamber 46 by the throttle holes 55 (see FIG. 2). In such case, the second moving force F4 moving the piston 44 toward the canceller chamber 52 by means of the second centrifugal hydraulic pressure caused by the oil filled in the hydraulic chamber 46 is calculated so as to be equal to the first moving force F3 moving the piston 44 toward the hydraulic chamber 46 by means of the first centrifugal hydraulic pressure caused by the oil filled in the canceller chamber 52. Accordingly, the first and second moving forces F3 and F4 cancel each other. Consequently, the piston 44 is biased by the biasing forces of the coil springs 45 biasing the piston 44 toward the hydraulic chamber 46. As a result, a hydraulic pressure that may generate a moving force larger than the biasing forces of the coil springs 45 is applied to the hydraulic chamber 46; thereby, the piston 44 may be surely moved toward the canceller chamber 52 against the biasing forces of the coil springs 45. Therefore, the clutch device 40 is brought into the disconnected state. As describe above, the moving force required for bringing the clutch device 40 into the disconnected state may be calculated; thereby, an appropriate oil pump for applying the hydraulic pressure to the hydraulic chamber 46 may be easily selected.

Second, a case where the hybrid vehicle is brought into motion in combination with the driving forces of the EG 10 and the electric motor 20 will be explained as follows. For example, when the hybrid vehicle is at startup and when the hybrid vehicle is in a normal moving state, the hybrid vehicle is brought into motion in combination with the driving forces of the EG 10 and the electric motor 20. At this time, the clutch device 40 is brought from the disconnected state to the connected state; therefore, the input shaft 41 is again connected to the output shaft 26. In order to connect the input shaft 41 to the output shaft 26, the electromagnetic switching valve 50 is firstly driven to thereby switch the circuit of the operation position P1 connecting to the hydraulic chamber 46, to the circuit of the operation position P2 directly connecting to the reservoir 72. Accordingly, the hydraulic pressure in the hydraulic chamber 46 decreases to the outside atmospheric pressure. However, at this time, the hydraulic chamber 46 is continuously rotating and the centrifugal force is generated in the hydraulic chamber 46. Therefore, it is difficult for the oil of the hydraulic chamber 46 to be completely discharged therefrom. As a result, a predetermined volume of the oil may unpredictably remain in the hydraulic chamber 46. In addition, the oil supplied to the canceller chamber 52 in order to bring the clutch device 40 into the disconnected state remains in the canceller chamber 52 that is continuously rotating in the same way as the hydraulic chamber 46.

According to the embodiment, as described above, the first moving force F3 moving the piston 44 toward the hydraulic chamber 46 by means of the first centrifugal hydraulic pressure caused by the oil stored in the canceller chamber 52 is set to be equal to the second moving force F4 moving the piston 44 toward the canceller chamber 52 by means of the second centrifugal hydraulic pressure caused by the oil stored in the hydraulic chamber 46. Therefore, even when the hydraulic chamber 46 is filled with the unpredictable volume of the oil, the first and second moving forces F3 and F4 offset each other. Consequently, at least the biasing forces of the coil springs 45 may be obtained so as to serve as a biasing force acting in a direction in which the piston 44 is biased toward the hydraulic chamber 46 (the direction corresponds to a connecting direction to bring the clutch device 40 into the connected state). As a result, the piston 44 is moved toward the hydraulic chamber 46, thereby surely and promptly bringing the clutch device 40 into the connected state.

As clearly understood from the above explanation, according to the embodiment, the second moving force F4 generated by the second centrifugal hydraulic pressure caused by the oil filled in the whole hydraulic chamber 46 is equal to the first moving force F3 generated by the first centrifugal hydraulic pressure caused by the oil filled in the canceller chamber 52. In other words, the first moving force F3 acting from the canceller chamber 52 and the second moving force F4 acting from the hydraulic chamber 46 are set to be equal to each other on a condition that the oil remains in the whole hydraulic chamber 46. Accordingly, the first moving force F3 moving the piston 44 toward the hydraulic chamber 46 by means of the first centrifugal hydraulic pressure caused by the oil stored in the canceller chamber 52 surely offsets the second moving force F4 moving the piston 44 toward the canceller chamber 52 by means of the second centrifugal hydraulic pressure caused by the oil remaining in the hydraulic chamber 46 in which a level of the oil in a radial direction of the case 3 varies (see FIG. 3). In addition, according to the embodiment, for example, even in a case where the oil remaining in the hydraulic chamber 46 decreases, the piston 44 may be biased in the connecting direction by means of the second centrifugal hydraulic pressure caused by the oil of the canceller chamber 52. Therefore, the clutch device 40 may be appropriately brought into the connected state. Consequently, at least the biasing forces of the coil springs 45 may be surely obtained so as to serve as the biasing force biasing the piston 44 toward the hydraulic chamber 46. As a result, the clutch device 40 may be surely brought into the connected state.

Thus, according to the embodiment, the clutch device 40 simply configured at low cost may be promptly and surely brought into the connected state. Therefore, the driver does not have uncomfortable sensations when pressing the accelerator pedal. Additionally, the friction plates 42 and the separate plates 43 may not be incompletely engaged with one another, therefore inhibiting the friction plates 42 and the separate plates 43 from being worn or being stuck to one another due to slippage therebetween.

In addition, when the clutch device 40 is in the disconnected state where the hydraulic pressure is applied to the hydraulic chamber 46, the oil is supplied from the hydraulic chamber 46 through the throttle holes 55 to the canceller chamber 52 and the oil is stored in the canceller chamber 52 so as to be positioned radially outward relative to the predetermined radius R. At this time, a biasing force biasing the piston 44 toward the hydraulic chamber 46 by means of the first centrifugal hydraulic pressure of the canceller chamber 52, i.e. the first moving force F3 moving the piston 44 toward the hydraulic chamber 46 against a biasing force acting in a disconnecting direction to bring the clutch device 40 into the disconnected state may be surely cancelled by the second moving force F4 generated by the second centrifugal hydraulic pressure caused by the oil supplied to the hydraulic chamber 46. Accordingly, the hydraulic pressure that is larger than the biasing forces of the coil springs 45 serving as the elastic members, are applied to the hydraulic chamber 46, thereby smoothly bringing the clutch device 40 into the disconnected state without an influence of the oil of the canceller chamber 52. In addition, the hydraulic pressure applied to the hydraulic chamber 46 may be investigated as described above; therefore, an appropriate oil pump may be easily selected.

Further, according to the embodiment, the clutch device 40 is configured as a clutch mechanism for the hybrid vehicle. For example, when the hybrid vehicle requires a large driving force, the clutch mechanism is brought into a connected state and the driving force of the EG 10 is used in conjunction with the driving force of the electric motor 20. Meanwhile, when the driver decelerates the hybrid vehicle, the clutch mechanism is brought into a disconnected state and power generation efficiency of the electric motor 20 is increased. The clutch device 40 according to the embodiment may be applied to the hybrid vehicle in which the friction plates 42 and the separate plates 43 frequently engage with and disengage from one another. The first clutch plates serving as the separate plates 43 are engaged with the radially-outward engagement portion 26a. The second clutch plates serving as the friction plates 42 are engaged with the radially-inward engagement portion 41d. In particular, the separate plates 43 are arranged at and engaged with the output shaft 26 (the first shaft) in the same way as the piston 44 having the pressing portion 44a pressing the separate plates 43 against the friction plates 42 is arranged at the output shaft 26. Accordingly, a pressing mechanism between the separate plates 43 and the piston 44 (pressing portion 44a) may be simply configured at low cost.

Furthermore, according to the embodiment, the first moving force F3 generated by the first centrifugal hydraulic pressure caused by the oil stored in the canceller chamber 52 is set to be equal to the second moving force F4 generated by the second centrifugal hydraulic pressure caused by the oil stored in the whole hydraulic chamber 46. Alternatively, the first moving force F3 may be arbitrarily set to thereby modify the relation (balance) between the first moving force F3 and the second moving force F4.

For example, in order to further surely bring the clutch device 40 into the disconnected state, the predetermined radius R determining the inner diameter of the canceller chamber 52 is set to be small; thereby, a radial distance extending between chain double-dashed lines L1 and L2 shown in FIG. 3 (the radial distance extends substantially between a radially outward side of the coil springs 45 and the radially-outward inner circumferential surface 52a is increased (the chain double-dashed lines L1 and L2 extend along the rotational axis of the input shaft 41 so as to be perpendicular to the rotational axis). As a result, the first moving force F3 acting from the canceller chamber 52 toward the hydraulic chamber 46 may be increased.

Moreover, the level of the oil remaining in the hydraulic chamber 46 is investigated; thereby, the predetermined radius R of the canceller chamber 52 may be determined by the actual level of the oil in the hydraulic chamber 46. Consequently, the predetermined radius R of the canceller chamber 52 is set to be large compared to the case where the oil is filled in the whole hydraulic chamber 46 as seen in the embodiment, thereby minimizing the first moving force F3. As a result, the hydraulic pressure to be applied to the hydraulic chamber 46 may be reduced. In addition, a capacity of the electric oil pump 60 may be reduced, resulting in a cost reduction.

As described above, the predetermined radius R is set to be large, thereby reducing the radial distance extending substantially between the radially outward side of the coil springs 45 and the radially-outward inner circumferential surface 52a. Accordingly, the canceller chamber 52 may be configured so as to have a small area by which the piston 44 is moved in the connecting direction by means of the first centrifugal hydraulic pressure. Consequently, the biasing forces of the coil springs 45 may be reduced; therefore, the clutch device 40 being smoothly switchable between the connected and disconnected states may be obtained.

As described above, according to the embodiment, the first moving force F3 of the canceller chamber 52 may be designed arbitrarily. Therefore, in a case where the oil is discharged from the hydraulic chamber 46 (the hydraulic pressure is released from the hydraulic chamber 46) to bring the clutch device 40 into the connected state accordingly and in a case where the oil is supplied to the hydraulic chamber 46 to bring the clutch device 40 into the disconnected state, the balance between the first moving force F3 generated by the first centrifugal hydraulic pressure caused by the oil of the canceller chamber 52 and the second moving force F4 generated by the second centrifugal hydraulic pressure caused by the oil of the hydraulic chamber 46 may be set arbitrarily. As a result, the clutch device 40 having broad utility may be obtained.

The clutch device 40 according to the embodiment is applied to the hybrid vehicle. Alternatively, the clutch device 40 according to the embodiment may be adapted to a general vehicle, a cultivating machine, and the like each driven by an engine. Thus, the clutch device 40 may be configured so as to include one drive source connecting to the input shaft 41 and so as to transmit and block a driving force of the drive source between the engine and a transmission. Effects similar to those of the clutch device 40 according to the embodiment may be obtained by the clutch device 40 including the one drive source.

According to the embodiment, the output shaft 26 corresponds to the first shaft and the separate plates 43 serving as the first clutch plates are engaged with the radially-outward engagement portion 26a of the output shaft 26. In addition, the input shaft 41 corresponds to the second shaft and the friction plates 42 serving as the second clutch plates are engaged with the radially-inward engagement portion 41d of the input shaft 41. Alternatively, the input shaft 41 may serve as the first shaft and the separate plates 43 serving as the first clutch plates may be engaged with the radially-inward engagement portion 41d of the input shaft 41. In addition, the output shaft 26 may serve as the second shaft and the friction plates 42 serving as the second clutch plates may be engaged with the radially-outward engagement portion 26a of the output shaft 26. As a result, the clutch device 40 configured in this way differs from the clutch device 40 according to the embodiment in that the pressing portion 44a of the piston 44 fitted to the output shaft 26 has a slightly complex configuration from the configuration of the pressing portion 44a according to the embodiment. However, effects similar to those of the clutch device 40 according to the embodiment may be obtained by the clutch device 40 including the pressing portion 44a having the complex configuration.

Further, the input shaft 41 and the output shaft 26 according to the embodiment may be axially arranged in a reversed order. That is, the output shaft 26 is connected to the EG 10 so as to serve as a new input shaft. Meanwhile, the input shaft 41 is configured so as to integrally rotate with the rotor 21 of the electric motor 20 and so as to serve as a new output shaft. Similar effects to those of the clutch device 40 according to the embodiment will be obtained from the clutch device 40 in which the input shaft 41 serving as the new output shaft and the output shaft 26 serving as the new input shaft are utilized.

Furthermore, according to the embodiment, the T/M 5 is the planetary gear automatic transmission. Alternatively, the T/M 5 may be formed by a continuously variable transmission or by a manual transmission including a synchromesh gear mechanism.

Moreover, according to the embodiment, the coil springs 45 are formed by the elastic members. Alternatively, the coil springs 45 may be formed by plate springs and the like. Additionally, rubber members or gas may be applied as the coil springs 45 to the clutch device 40 according to the embodiment.

In addition, according to the embodiment, the drive system 1 for the hybrid vehicle may be utilized in different usage states from the aforementioned usage states described in the embodiment. For example, the drive system 1 according to the embodiment may be driven by the electric motor 20 in a state where the clutch device 40 is in the disconnected state. The clutch device 40 may be switched between the connected and disconnected states depending on driving conditions of the hybrid vehicle after the hybrid vehicle is brought into motion.

As described above, according to the aforementioned embodiment, the clutch device 40 for the hybrid vehicle includes the input shaft 41 rotationally connected to the EG 10, the output shaft 26 coaxially arranged with the rotational axis of the input shaft 41, the case 3 supporting the input shaft 41 and the output shaft 26 by the ball bearing 34 along the rotational axis so that the input shaft 41 and the output shaft 26 are rotatable, the plurality of separate plates 43 movably engaged with one of the input shaft 41 and the output shaft 26 along the rotational axis, the plurality of friction plates 42 arranged in an alternating manner with the separate plates 43 and being engageable with and separable from the separate plates 43, the friction plates 42 being movably engaged with the other one of the input shaft 41 and the output shaft 26 along the rotational axis, the piston 44 slidably fitted to the cylindrical portion 48 along the rotational axis, the cylindrical portion 48 being integrally formed with the output shaft 26 or the input shaft 41, the piston 44 including the pressing portion 44a pressing the separate plates 43 and the friction plates 42, the coil springs 45 arranged between the piston 44 and the cylindrical portion 48, the coil springs 45 biasing the piston 44 toward the separate plates 43 and the friction plates 42 and pressing the separate plates 43 and the friction plates 42 by the pressing portion 44a to engage the separate plates 43 and the friction plates 42 with one another, the hydraulic chamber 46 defined by the cylindrical portion 48 and the first axial end surface 44c of the piston 44 and arranged between the cylindrical portion 48 and the first axial end surface 44c, the hydraulic chamber 46 receiving the hydraulic pressure of the oil, the hydraulic pressure allowing the piston 44 to separate from the separate plates 43 and the friction plates 42 against the biasing forces of the coil springs 45, the accommodating chamber 80 defined by the cylindrical portion 48 and the second axial end surface of the piston 44 to accommodate the coil springs 45, the canceller chamber 52 defined by the cylindrical portion 48 and the second axial end surface of the piston 44 and arranged between the cylindrical portion 48 and the second axial end surface, the canceller chamber 52 connecting to the outer side of the cylindrical portion 48 via the discharge hole 53 formed at a portion of the cylindrical portion 48, the portion being located at the predetermined radial distance from the rotational axis, the canceller chamber 52 including the first portion 521 constituting a portion of the accommodating chamber 80, the second portion 522 extending from the first portion 521 in the direction toward the separate plates 43, and the third portion 523 extending in the direction separating from the rotational axis, and the throttle holes 55 formed in a portion of the piston 44 to connect the hydraulic chamber 46 to the canceller chamber 52, the portion being located at the radially inward side of the portion of the cylindrical portion 48.

For example, when the oil is supplied to the hydraulic chamber 46 in order to bring the clutch device 40 into the disconnected state, the oil is simultaneously supplied from the hydraulic chamber 46 through the throttle holes 55 to the canceller chamber 52. Then, the oil supplied to the canceller chamber 52 is stored therein by the centrifugal force of the canceller chamber 52 rotating about the rotational axis of the input shaft 41. In addition, the oil supplied to the canceller chamber 52 is discharged therefrom through the discharge hole 53 to the outer side of the cylindrical portion 48. As a result, the oil of the canceller chamber 52 is maintained to a predetermined level in the radial direction of the case 3. As described above, the oil supplied from the hydraulic chamber 46 to the canceller chamber 52 is stored therein so as to be positioned at the predetermined radial distance from the rotational axis.

Accordingly, even in the case where the oil remains in the hydraulic chamber 46 when the oil is released from the hydraulic chamber 46 in order to bring the clutch device 4 into the connected state, the second centrifugal hydraulic pressure generated by the oil of the hydraulic chamber 46 is cancelled by the first centrifugal hydraulic pressure generated by the oil of the canceller chamber 52. Consequently, the piston 44 is surely biased by the biasing forces of the coil springs 45 toward the hydraulic chamber 46, thereby promptly and surely bringing the clutch device 40 into the connected state. In addition, the friction plates 42 and the separate plates 43 are inhibited from being worn or being stuck to one another due to slippage therebetween.

According to the aforementioned embodiment, in a state where the oil is filled in the hydraulic chamber 46 and the oil is stored in the canceller chamber 52 that is positioned at the predetermined radial distance from the rotational axis, the first moving force F3 calculated on the basis of the centrifugal force acting on the oil of the canceller chamber 52 is equal to the second moving force F4 calculated on the basis of the centrifugal force acting on the oil of the hydraulic chamber 46. The first moving force F3 moves the piston 44 toward the hydraulic chamber 46. The second moving force F4 moves the piston 44 toward the canceller chamber 52.

In particular, the first centrifugal hydraulic pressure caused by the oil remaining in the whole hydraulic chamber 46 may be surely cancelled by the second centrifugal hydraulic pressure caused by the oil in the canceller chamber 52. In addition, in a case where the oil remaining in the hydraulic chamber 46 decreases, the piston 44 may be biased by the second centrifugal hydraulic pressure of the canceller chamber 52 in the connecting direction of the clutch device 40, thereby appropriately bringing the clutch device 40 into the connected state.

According to the aforementioned embodiment, the electric motor 20 is arranged in the case 3. The electric motor 20 includes the stator 22 attached to the case 3 and the rotor 21 radially arranged to face the stator 22. The rotor 21 is rotatable relative to the stator 22 by the magnetic repelling force or the magnetic attractive force generated between the stator 22 and the rotor 21. The input shaft 41 is attached to the EG 10 corresponding to the drive source and is engaged with the friction plates 42. The output shaft 26 is integrally connected to the rotor 21 and is engaged with the separate plates 43.

As described above, the clutch device 40 is configured as the clutch mechanism for the hybrid vehicle as described above. For example, when the hybrid vehicle requires the large driving force, the clutch mechanism is brought into the connected state and the driving force of the EG 10 is used in conjunction with the driving force of the electric motor 20. Meanwhile, when the driver decelerates the hybrid vehicle, the clutch mechanism is brought into the disconnected state (the EG 10 is disconnected from the T/M 5) and the power generation efficiency of the electric motor 20 is increased. Thus, the clutch device 40 according to the embodiment is appropriate to be utilized in the hybrid vehicle in which the clutch mechanism is frequently switched between the connected and disconnected states.

Moreover, as described above, the separate plates 43 are arranged at the output shaft 26 in the same way as the piston 44 having the pressing portion 44a is arranged at the output shaft 26; therefore, the pressing mechanism between the separate plates 43 and the piston 44 may be simply configured at low cost.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A clutch device for a vehicle, comprising:
an input shaft rotationally connected to a drive source;
an output shaft coaxially arranged with a rotational axis of the input shaft;
a case supporting the input shaft and the output shaft by a bearing along the rotational axis so that the input shaft and the output shaft are rotatable;
a plurality of first clutch plates movably engaged with one of the input shaft and the output shaft along the rotational axis;
a plurality of second clutch plates arranged in an alternating manner with the first clutch plates and being engageable with and separable from the first clutch plates, the second clutch plates being movably engaged with the other one of the input shaft and the output shaft along the rotational axis;
a piston slidably fitted to a cylindrical portion along the rotational axis, the cylindrical portion being integrally formed with the output shaft or the input shaft, the piston including a pressing portion pressing the first clutch plates and the second clutch plates;
an elastic member arranged between the piston and the cylindrical portion, the elastic member biasing the piston toward the first clutch plates and the second clutch plates and pressing the first clutch plates and the second clutch plates by the pressing portion to engage the first clutch plates and the second clutch plates with one another;
a hydraulic chamber defined by the cylindrical portion and a first end surface of the piston and arranged between the cylindrical portion and the first end surface, the hydraulic chamber receiving a hydraulic pressure of oil, the hydraulic pressure allowing the piston to separate from the first clutch plates and the second clutch plates against a biasing force of the elastic member;
a canceller chamber defined by the cylindrical portion and the second end surface of the piston and arranged between the cylindrical portion and the second end surface, the canceller chamber connecting to an outer side of the cylindrical portion via a discharge hole formed at a portion of the cylindrical portion, the portion being located at a predetermined radial distance from the rotational axis; and
a throttle hole formed in a portion of the piston to connect the hydraulic chamber to the canceller chamber, the portion being located at a radially inward side of the portion of the cylindrical portion.

2. The clutch device according to claim 1, wherein in a state where the oil is filled in the hydraulic chamber and the oil is stored in the canceller chamber that is positioned at the predetermined radial distance from the rotational axis, a first moving force calculated on the basis of a centrifugal force acting on the oil of the canceller chamber is equal to a second moving force calculated on the basis of a centrifugal force acting on the oil of the hydraulic chamber, the first moving force moving the piston toward the hydraulic chamber, the second moving force moving the piston toward the canceller chamber.

3. The clutch device according to claim 1, wherein a rotating electric machine is arranged in the case, and the rotating electric machine includes a stator attached to the case and a rotor radially arranged to face the stator, the rotor being rotatable relative to the stator by a magnetic repelling force or a magnetic attractive force generated between the stator and the rotor, and
wherein the input shaft is attached to an engine corresponding to the drive source and is engaged with the second clutch plates, and the output shaft is integrally connected to the rotor and is engaged with the first clutch plates.

4. The clutch device according to claim 2, wherein a rotating electric machine is arranged in the case, and the rotating electric machine includes a stator attached to the case and a rotor radially arranged to face the stator, the rotor being rotatable relative to the stator by a magnetic repelling force or a magnetic attractive force generated between the stator and the rotor, and
wherein the input shaft is attached to an engine corresponding to the drive source and is engaged with the second clutch plates, and the output shaft is integrally connected to the rotor and is engaged with the first clutch plates.

5. A clutch device for a vehicle, comprising:
an input shaft rotationally connected to a drive source;
an output shaft coaxially arranged with a rotational axis of the input shaft;
a case supporting the input shaft and the output shaft by a bearing along the rotational axis so that the input shaft and the output shaft are rotatable;
a plurality of first clutch plates movably engaged with one of the input shaft and the output shaft along the rotational axis;
a plurality of second clutch plates arranged in an alternating manner with the first clutch plates and being engageable with and separable from the first clutch plates, the second clutch plates being movably engaged with the other one of the input shaft and the output shaft along the rotational axis;
a piston slidably fitted to a cylindrical portion along the rotational axis, the cylindrical portion being integrally formed with the output shaft or the input shaft, the piston including a pressing portion pressing the first clutch plates and the second clutch plates;
an elastic member arranged between the piston and the cylindrical portion, the elastic member biasing the piston toward the first clutch plates and the second clutch plates and pressing the first clutch plates and the second clutch plates by the pressing portion to engage the first clutch plates and the second clutch plates with one another;
a hydraulic chamber defined by the cylindrical portion and a first end surface of the piston and arranged between the cylindrical portion and the first end surface, the hydraulic chamber receiving a hydraulic pressure of oil, the hydraulic pressure allowing the piston to separate from the first clutch plates and the second clutch plates against a biasing force of the elastic member;
an accommodating chamber defined by the cylindrical portion and a second end surface of the piston to accommodate the elastic member;
a canceller chamber defined by the cylindrical portion and the second end surface of the piston and arranged between the cylindrical portion and the second end surface, the canceller chamber connecting to an outer side of the cylindrical portion via a discharge hole formed at a portion of the cylindrical portion, the portion being located at a predetermined radial distance from the rotational axis, the canceller chamber including a first portion constituting a portion of the accommodating chamber, a second portion extending from the first portion in a direction toward the first clutch plates, and a third portion extending in a direction separating from the rotational axis; and
a throttle hole formed in a portion of the piston to connect the hydraulic chamber to the canceller chamber, the portion being located at a radially inward side of the portion of the cylindrical portion.

* * * * *